Figure 1:
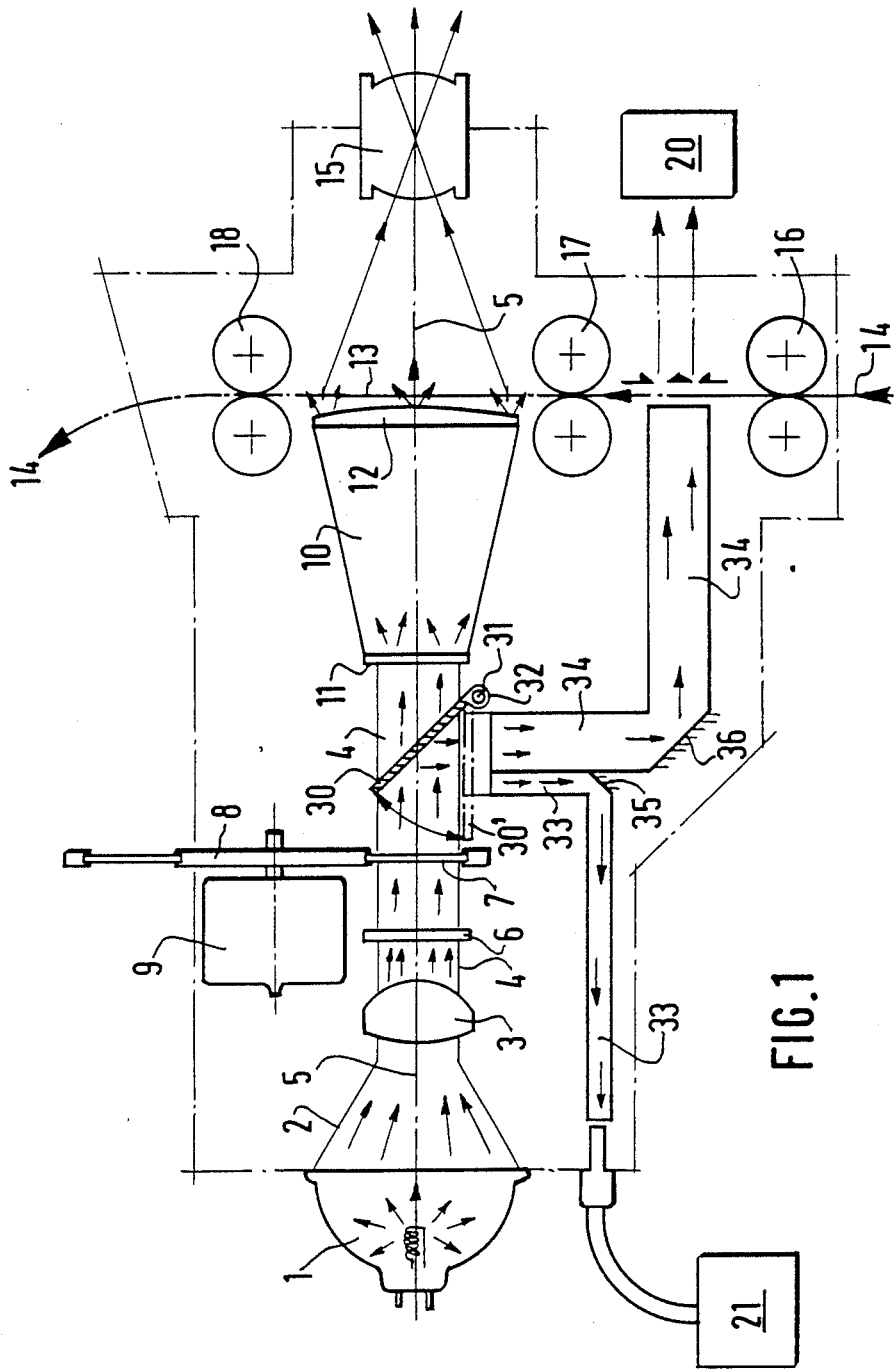

United States Patent [19]

Gerstch

[11] Patent Number: 4,956,663
[45] Date of Patent: Sep. 11, 1990

[54] DEVICE FOR PRINTING PHOTOGRAPHS

[75] Inventor: Franck Gerstch, Meylan, France

[73] Assignee: Kis Photo Industrie, Grenoble, France

[21] Appl. No.: 392,778

[22] Filed: Aug. 11, 1989

[30] Foreign Application Priority Data

Aug. 18, 1988 [FR] France ................ 88 11137

[51] Int. Cl.$^5$ .......................................... G03B 27/80
[52] U.S. Cl. .......................... 355/38; 355/68; 355/71
[58] Field of Search ............... 355/38, 43, 45, 68, 355/71; 356/404, 444

[56] References Cited

U.S. PATENT DOCUMENTS

| | | | |
|---|---|---|---|
| 2,049,556 | 8/1936 | Chapman et al. | 355/38 |
| 3,649,118 | 3/1972 | Yano et al. | 355/68 X |
| 4,101,217 | 7/1978 | Fergg et al. | 355/38 |
| 4,152,068 | 5/1979 | Bickl et al. | 355/38 |
| 4,272,186 | 6/1981 | Plummer | 355/71 X |

FOREIGN PATENT DOCUMENTS 2600783 12/1987 France .

Primary Examiner—L. T. Hix
Assistant Examiner—D. Rutledge
Attorney, Agent, or Firm—Wall and Roehrig

[57] ABSTRACT

An apparatus for printing photographic prints has a negative exposing section, including a light source, an optical light filter system forming a beam of light along a path, a film transporting system for passing the negative film to be printed through the optical path of the light system, and a lens for projecting the virtual image to be printed onto the printing paper. A mirror is pivoted along one of its edges so that it can be raised into the light path to selectively reflect the light from the light source to a color analyzing system and optionally to a densitometer system. The color analysis system as positioned ahead of the negative printing station along the negative film transport path. The mirror is controlled to transmit light through the negative film when printing is taking place and to deflect all of the light to the color analysis and densitometer systems when printing is not taking place.

11 Claims, 2 Drawing Sheets

DEVICE FOR PRINTING PHOTOGRAPHS

The invention relates to an improved installation for printing photographic prints, of the type comprising an exposure section, a colour analysis system and, if appropriate, a densitometer.

As is known, an exposure section essentially comprises, in order along an optical axis:
. a regulated light source,
. a condenser defining a directional light flux, of narrow cross-section, parallel to the optical axis,
. then a filter system acting on this light flux,
. a mixer,
. a frame-moving system intended for the gradual advancing of the negative film of the frame to be printed in the form of a photographic print,
. and finally, a lens projecting the virtual image onto the exposure plane along which the paper to be exposed passes.

The colour analysis system which is arranged in the path of the negative film to be printed, and upstream of the optical axis, is an automatic system which makes it possible, from optical measurements performed on the negative film, to determine the exact conditions for printing this negative, in particular the duration and intensity of exposure.

The densitometer is an apparatus intended to measure optical density, particularly in reflection, in the primary colours (red, blue, green) of an opaque coloured print, with a view to determining the shade of this print in each of the said colours.

The invention makes it possible, by virtue of a single light source, to provide the operation of these various functions.

According to the invention, the improved installation for the printing of photographic prints is of the type comprising:
an exposure section comprising in order, along an optical axis:
  . a regulated light source,
  . a condenser defining a directional light flux, of narrow cross-section, parallel to the optical axis,
  . a filter system acting on the light flux,
  . a mixer,
  . a frame-moving system for the negative film to be printed,
  . and a lens;
a colour analysis system arranged in the path of the negative film to be printed, upstream of the optical axis, wherein, in the optical path of the directional light flux, it comprises a retractable mirror intended :
on the one hand, during the frame exposures, to be retracted, in a manner such that the entire light flux is directed onto the frame-moving system and thence onto the lens;
and on the other hand, when frames are not being exposed, to intercept this light flux and to reflect it in order to direct it onto the colour analysis system.

In other words, the invention comprises utilising the exposure lamp as the sole light source and, during the colour analysis phase, intercepting with a retractable mirror the narrow directional light flux issuing from this lamp, just before the mixer of the frame-moving system, in order to direct it onto the colour analysis system.

In an advantageous embodiment, particularly suitable for photographic print processing units comprising a densitometer system, the light flux reflected by the said mirror is divided into at least two component beams channelled, respectively, one towards the colour analysis system and the other towards the densitometer.

Advantageously, in practice:
the mirror is mounted to pivot on one of its sides about an axis which is orthogonal to the directional light flux;
the pivoting movement of the mirror is controlled by a direct current motor under the command of the general exposure condition control system;
the mirror reflects in the visible light range;
the two component beams are guided by a set of prisms and waveguides;
the two component beams are channelled by optical fibres.

Figure 2:
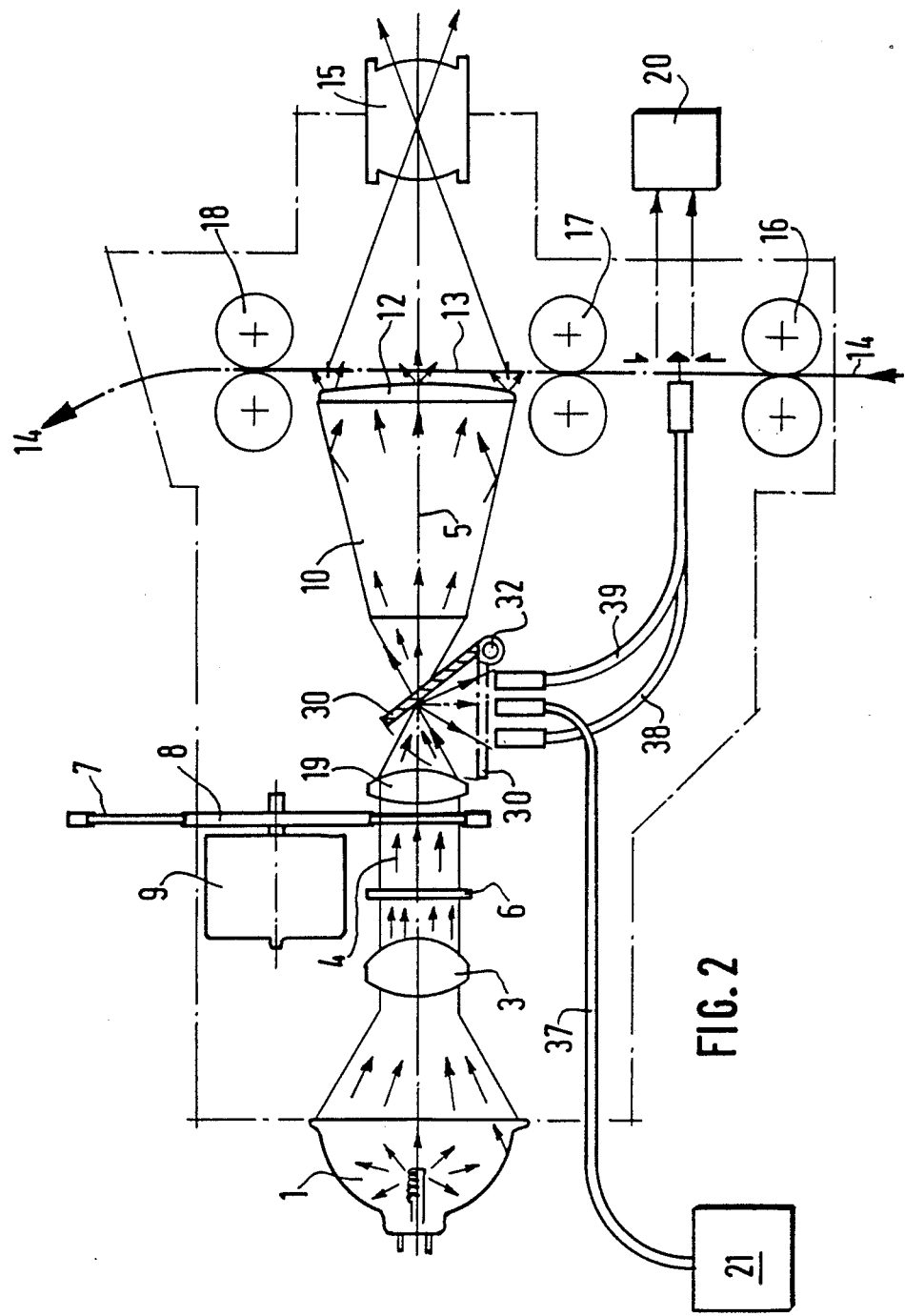

The manner in which the invention can be implemented and the advantages which accrue therefrom will be more apparent from the two examples of embodiment which follow, given by way of indication and not limitation and shown diagrammatically in the two attached figures, in which FIG. 1 shows a first embodiment of the invention with a set of prisms and waveguides, whereas FIG. 2 is an illustration of a similar arrangement but with optical fibres.

As is known, an exposure section of a unit for printing photographic prints essentially comprises (cf. figures) an exposure lamp (1), for example a 100 watt halogen lamp having an elliptical reflector from which there issues a 20° beam (2) concentrated on a condenser (3). From this condenser (3) there issues a directional light flux, of narrow cross-section (4), parallel to the optical axis (5) which then passes through an infrared filter (6), then passes in front of a filter as such (7) mounted on a filter mount (8), driven by a stepping motor (9). The parallel directional light flux (4) then encounters a mixing prism (10), which may or may not have a diffuser (11) at the inlet and advantageously has, at the outlet, a concave diffuser (12) arranged exactly opposite the frame (13) of the negative film (14) to be reproduced. The assembly further comprises a lens (15) which projects the virtual image to be printed onto the exposure plane.

The frame-moving system of the film (14) advantageously comprises three pairs of synchronously driven rollers, respectively (16, 17 and 18). Between the two pairs of rollers (16, 17), the moving negative film (14) passes in front of the colour analysis system symbolized by the reference (20). The reference (21) designates the densitometer system.

In an alternative embodiment shown in FIG. 2, the light flux likewise comprises a second condenser (19).

According to the characteristic feature of the invention, in the zone comprised between the filter (7) and the mixer (10), the narrow directional light flux (4) is intercepted by a tilting mirror (30) mounted to pivot on one of its sides (31) about an axis (32) orthogonal to the directional light flux (4). The pivoting movement of this mirror (30) is controlled by a direct current motor (not shown), commanded by the general exposure condition control system of the apparatus. In practice, this mirror (30) reflects in the visible light range. It may advantageously be an aluminium plate covered with aluminium of the type which is marketed commercially under the registered trademark BANDOXAL, the surface of which is at least 80% reflective.

During the exposure phase as such, that is to say during the frame exposure phase, the mirror (30) is retracted relative to the light flux (4), as indicated in dot-and-dash lines in the position (30′).

According to the characteristic feature of the invention, outside this frame exposure phase, but during the colour analysis phase, the mirror (30) is lifted in order to intercept the entire light flux (4) and reflect it, directing it onto the colour analysis system (20) and possibly the densitometer (21), at least if the apparatus is equipped with such a system.

In order to do this, the reflected light flux is, in a first embodiment, received on two waveguides, (33) and (34) respectively, which by means of sets of prisms (35, 36) return the reflected light flux respectively to the analysis system (20) and/or the densitometer (21).

In an alternative embodiment shown in FIG. 2, the reflected light flux is divided into three component beams formed by optical fibres, respectively (37), to go to the densitometer (21), and (38, 39) to go to the colour analysis system (20).

The fact that use is being made of a directional light flux which is intense but of narrow cross-section makes it possible to reduce substantially the general bulk of the apparatus. The fact that the light flux which reaches the colour analysis system (20) and/or the densitometer (21) is directional makes it possible to obtain excellent efficiency, and finally the fact that this flux (4) has been cleared of infrared rays by the filter (6) makes it possible to work in the visible light range.

In an alternative embodiment (not shown), intermediate between the two embodiments respectively shown in FIG. 1 and in FIG. 2, the light flux reflected by the retractable mirror (30) during the colour analysis phase is received by a single waveguide intended to guide the light flux to the analysis system (20). At the centre of the said waveguide is positioned an optical fibre intended to convey part of the light flux towards a densitometer (21). Moreover, a second optical fibre, of a diameter slightly less than that of the preceding one, likewise conveys part of the light flux to the colour analysis level, and more specifically to the slice of negative film being analysed, which is intended to make it possible to read the bar code present on this slice. This bar code indicates the principal characteristics of the negative film. In this embodiment, just as in the alternative embodiment shown in FIG. 2, the device comprises a second condenser (19) intended to obtain a convergent-divergent light flux at the outlet of the latter.

The improved installation according to the invention possesses numerous advantages. Mention may be made of:

its compactness, the low optical losses and hence the high efficiency between the point where the light is available and the point where the functions are performed (colour analysis (20) and/or the densitometer (21));

finally, simplicity, since use is made only of a single light source which it is thus easy to regulate.

Hence, this arrangement can be used successfully in all apparatuses for printing photographic prints, particularly those intended to be employed by relatively unqualified personnel.

I claim:

1. Apparatus for printing photographic negatives that include
    a light source,
    projecting means for directing light from the source along an optical path,
    an exposure means mounted in the optical path for illuminating a film to be printed and projecting an image thereof onto an exposure plane for printing,
    color filter means positioned in said optical path between the light source and the exposure means for filtering said light,
    film transport means for passing a film to be printed sequentially through a color analysis means and then said exposure means,
    a reflecting means movably mounted adjacent to the optical path between the filter means and the exposure means,
    positioning means to selectively place the reflecting means in a first position within said optical path to direct filtered light to said color analysis means wherein the color content of a film is analyzed and a second position outside of said optical path to permit filtered light to illuminate a film in said exposure means wherein the image carried on said film is projected onto said exposure plane.

2. The apparatus of claim 1 that includes further means to project a portion of the filtered light reflected by said reflecting means to a densitometer means whereby the optical density of the filtered light is measured as the film is being analyzed.

3. The apparatus of claim 2 wherein said filter means includes a plurality of color filters and further includes a drive means to pass said filters sequentially through said optical path.

4. The apparatus of claim 1 wherein said reflecting means is a mirror that is pivotally mounted about an axis that is orthogonal to the axis of the optical path.

5. The apparatus of claim 4 that further includes a motor means for controlling said mirror, said motor means being part of an exposure control system.

6. The apparatus of claim 4 wherein said mirror reflects light in the visible range.

7. The apparatus of claim 2 that further includes prism means and waveguide means for bringing reflected light from the reflecting means to said densitometer means and said color analysis means.

8. The apparatus of claim 2 that further includes optical fiber means for bringing filtered light to the densitometer means and thecolor analysis means.

9. The apparatus of claim 1 that further includes a light condenser means positioned in the optical path in front of said light source for producing a light flux having a narrow cross section that is parallel to said optical path.

10. The apparatus of claim 1 that further includes a mixer positioned in said optical path.

11. The apparatus of claim 1 that further includes an infra red filter positioned in said optical path.

* * * * *